US009182128B2

United States Patent
Brantley et al.

(10) Patent No.: US 9,182,128 B2
(45) Date of Patent: Nov. 10, 2015

(54) HOME APPLIANCE WITH IMPROVED GRIDDLE COVER

(71) Applicant: BSH Home Appliances Corporation, Irvine, CA (US)

(72) Inventors: Matthew Brantley, Maryville, TN (US); Andrew Timothy Edwards, Lafollette, TN (US); Jeremy Nash, Knox, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 531 days.

(21) Appl. No.: 13/646,776

(22) Filed: Oct. 8, 2012

(65) Prior Publication Data

US 2014/0096761 A1    Apr. 10, 2014

(51) Int. Cl.
| | |
|---|---|
| *F24C 15/00* | (2006.01) |
| *F24C 15/14* | (2006.01) |
| *A47J 37/06* | (2006.01) |
| *F24C 15/12* | (2006.01) |
| *A47J 37/10* | (2006.01) |
| *A47J 37/07* | (2006.01) |

(52) U.S. Cl.
CPC ............... *F24C 15/14* (2013.01); *A47J 37/067* (2013.01); *F24C 15/12* (2013.01); *A47J 37/0786* (2013.01); *A47J 37/10* (2013.01); *A47J 37/101* (2013.01); *A47J 37/103* (2013.01)

(58) Field of Classification Search
CPC ..... A47J 37/067; A47J 37/0786; A47J 37/10; A47J 37/101; A47J 37/103
USPC ...................... 126/39 H, 39 M, 211, 215, 220
See application file for complete search history.

(56) References Cited

U.S. PATENT DOCUMENTS

| | | | | |
|---|---|---|---|---|
| 2,823,657 | A * | 2/1958 | Brodbeck | ................... 126/37 A |
| 3,034,419 | A * | 5/1962 | Hillebrand et al. | ............. 99/340 |
| 6,543,439 | B1 * | 4/2003 | Kollner | ........................ 126/221 |
| 2010/0175682 | A1 * | 7/2010 | Erikson et al. | .............. 126/25 R |

* cited by examiner

*Primary Examiner* — Kenneth Rinehart
*Assistant Examiner* — Gajanan M Prabhu
(74) *Attorney, Agent, or Firm* — James E. Howard; Andre Pallapies

(57) ABSTRACT

A home appliance having a griddle cover includes an appliance body; a cooktop on the appliance body and having a griddle; a griddle cover for removable disposition on the griddle for protecting the griddle from contaminants, the griddle cover including a cover body having a plurality of support elements on the cover body; and a mounting arrangement for removably mounting the griddle cover to the griddle including a plurality of feet mounted to the support elements for supporting the griddle cover on the griddle.

30 Claims, 15 Drawing Sheets

HOME APPLIANCE WITH IMPROVED GRIDDLE COVER

BACKGROUND OF THE INVENTION

The present invention relates broadly to home appliances for cooking and, more particularly, to a range having a griddle for cooking and an improved griddle cover.

Ranges provide a number of cooking options through, for example, ovens, steamers, cooktops and griddles. Griddles usually feature a generally planar cooking surface, with many griddles including some form of non-stick coating.

When not in use, the non-stick surface of a griddle should be protected from airborne contaminants as well as splashes, spills and overflows from cooking operations elsewhere on the cooktop. Further, the non-stick coating of the griddle should be protected from abrasion, scratches, gouges, and other damage that metallic utensils and other cooking implements can inflict. Accordingly, a griddle cover is desired.

The griddle cover should be attractive and coordinate with the overall appearance of the range while providing sufficient protection for the griddle. Further, a griddle cover should remain in covering relation with the griddle unless removed by a user of the range. The griddle cover could be made from a material similar to the griddle, i.e., with a non-stick coating. However, such a cover would be expensive, wasteful of materials and likely too heavy to function as an effective griddle cover.

Accordingly, stainless steel may be used to provide a light and attractive griddle cover. However, stainless steel or other metals can be abrasive to the non-stick coating on the griddle surface. In the past, a silicone gasket fixed to the bottom of the griddle cover by adhesive was used to protect the coated griddle from damage by the metallic cover.

A silicone gasket on the bottom of the griddle cover is effective in protecting the griddle cover however it is costly to manufacture due to the need to provide both a gasket and adhesive that are resistant to high temperatures associated with a range Further, the assembly of such a griddle cover with a silicone gasket is generally labor intensive. Therefore, there exists a need for a griddle cover that avoids the above-described problems.

SUMMARY OF THE INVENTION

It is accordingly an object to the present invention to provide a griddle cover that provides an inexpensive barrier between a metallic griddle cover body and the non-stick coating of the griddle.

It is another object of the present invention to provide such a griddle cover that relieves the above-described manufacturing burdens.

It is another object to the present invention to provide such a griddle cover that is easy to mount properly on the griddle and is prevented from sliding off the griddle until purposely removed by a user of the range.

To those ends, the present invention is directed to a home appliance having a griddle cover including an appliance body, a cooktop disposed on the appliance body and having a griddle, and a griddle cover for removable disposition on the griddle for protecting the griddle from contaminants. The griddle cover includes a cover body having a plurality of support elements on the cover body and a mounting arrangement for removably mounting the griddle cover to the griddle including a plurality of feet mounted to the support elements for supporting the griddle cover on the griddle.

Preferably, the cover body and the feet are made from different materials. Further, the cover body may preferably be made from metal and the plurality of feet is preferably made from a non-metallic material. More specifically, the plurality of feet is preferably made from a polymer. It is further preferable that the cover body is made from stainless steel and the plurality of feet is made from a polymer.

It is preferred that the plurality of feet is removably attached to the support elements and that the plurality of feet includes five similar feet.

The griddle cover body is preferably substantially rectangular and the plurality of feet preferably include one foot adjacent each corner of the cover body and one foot intermediate two other feet.

It is further preferred that the griddle cover body is formed from a substantially planar rectangular sheet having a top portion and side walls extending at substantially right angles with the top portion and the support members extending at substantially right angles with the walls in direct opposition to the top portion, wherein the support members extend substantially parallel with and spaced from the top portion.

Preferably, the feet have a griddle engagement portion including a generally horizontal first wall and a generally vertical second wall projecting downwardly from the first wall and that the first wall and second wall form a substantially 90° angle.

It is further preferred that a handle mounted is mounted the cover body, with the handle being mounted to the cover body at an end opposite the foot intermediate two other feet.

The present home appliance can be manifest in the form of a range. To that end, a range with a griddle cover includes a range body and a cooktop disposed on the range body and having a griddle. A griddle cover is included for removable disposition on the griddle for protecting the griddle from contaminants, the griddle cover including a cover body having a plurality of support elements on the cover body. A mounting arrangement is also included for removably mounting the griddle cover to the griddle including a plurality of feet mounted to the support elements for supporting the griddle cover on the griddle.

Preferably, the griddle cover body and the feet are made from different materials. It is preferred that the cover body is made from metal and the plurality of feet is made from a non-metallic material, and, more specifically, the plurality of feet is made from a polymer. Preferentially, the cover body is made from stainless steel and the plurality of feet is made from a polymer.

It is preferred that the plurality of feet are removably attached to the support elements and that the plurality of feet includes five similar feet.

It is further preferred that the cover body is substantially rectangular and the plurality of feet includes one foot adjacent each corner of the cover body and one foot intermediate two other feet. The cover body is preferably formed from a substantially planar rectangular sheet having a top portion and side walls extending at substantially right angles with the top portion and the support members extending at substantially right angles with the walls in direct opposition to the top portion, wherein the support members extend substantially parallel with and spaced from the top portion.

Preferably, the feet have a griddle engagement portion including a generally horizontal first wall and a generally vertical second wall projecting downwardly from the first wall, and that the first wall and second wall form a substantially 90° angle.

The present griddle cover may preferably include a handle mounted to the cover body, with the handle being mounted to the cover body at an end opposite the foot intermediate two other feet.

DESCRIPTION OF THE PREFERRED EMBODIMENT

Figure 1:
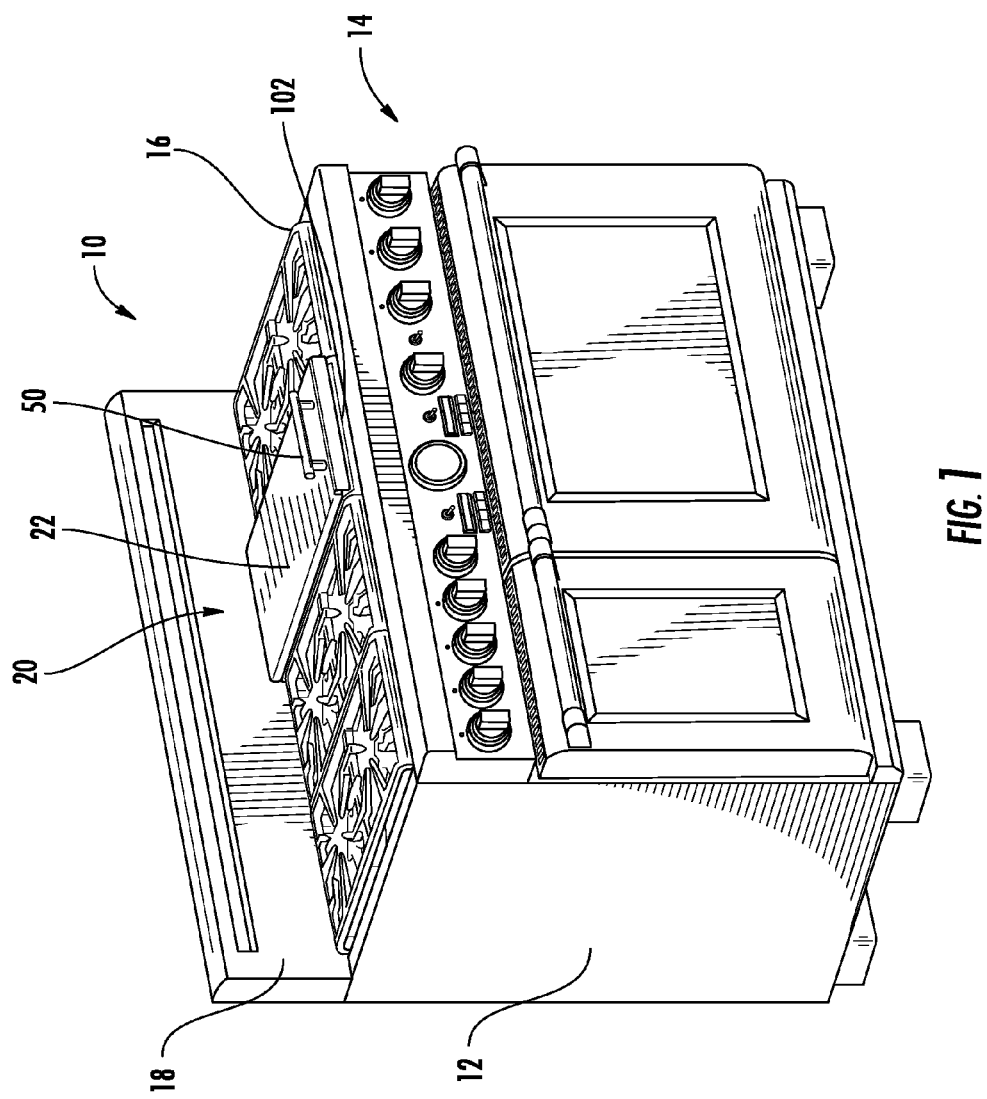
FIG. 1 is a front perspective view of a home appliance in the form of a range having a griddle and a griddle cover according to the preferred embodiment of the present invention.

Turning now to the drawings and, more particularly to FIG. 1, a home appliance in the form of a range having a griddle and an improved griddle cover is illustrated generally at 10 and includes a floor-standing range body 12 with two cavities formed in a lower portion 14 of the range body 12. As is generally known, many ranges provide a single oven cavity while others, such as the one pictured, define two cavities, both of which way may be an oven. Alternately, the configuration may be, for example, a single oven with a steamer or a warming drawer in the same range body 12.

A cooktop 16 is disposed on a top portion of the range body 12. The cooktop 16 includes a plurality of aligned burner pans. A generally planar upstanding backsplash 18 is provided at a rearward portion of the cooktop 16 protect the wall behind the range 10. A control panel is disposed in the lower portion 14 of the range adjacent the cooktop 16, allowing a user to control cooking throughout the range 10.

On certain ranges, like the one illustrated in FIG. 1, a griddle 102 may be provided on the cooktop 16 in a griddle space intermediate two burner pans. A griddle cover 20 according to a preferred embodiment of the present invention is fitted to the griddle 102.

The griddle 20 includes a generally planar cover body 22 having a handle 50 mounted at one end thereof for access by the user maneuvering the griddle cover 20 in and out of a covering relationship with the griddle 102.

Figure 2:
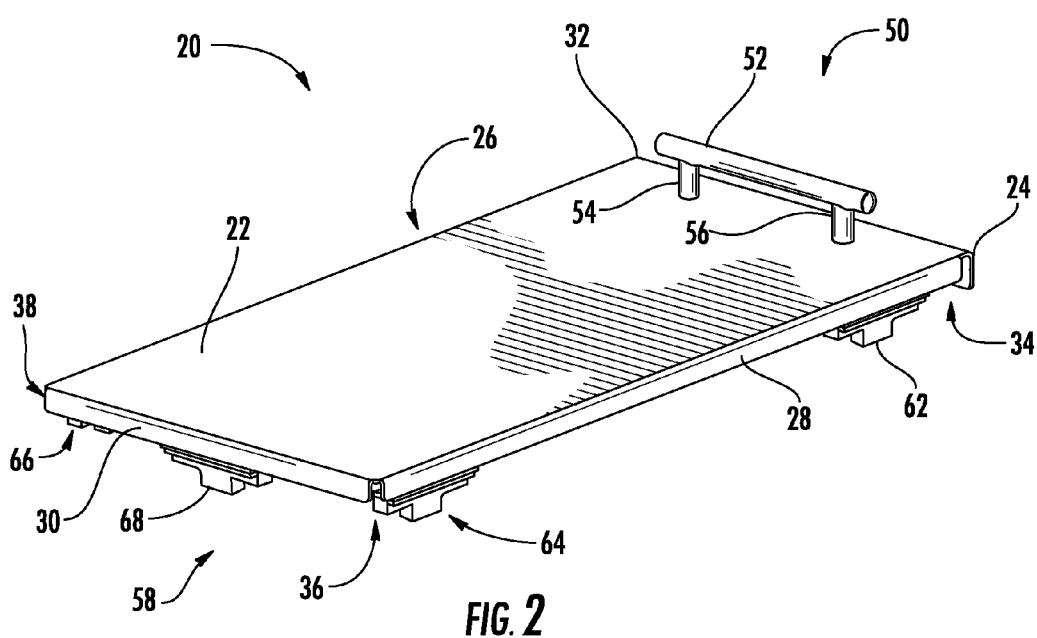
FIG. 2 is a rear perspective view of the griddle cover illustrated in FIG. 1.

Turning now to FIG. 2, the griddle cover 20 will be described in greater detail. The griddle cover 20 is made from a stainless steel sheet defining a planar cover body 22 that is sized to cover the griddle 102 seen in FIG. 1. With continued reference to FIG. 2, the rectangular griddle cover 20 includes four corners 32, 34, 36, 38 and four downturned walls including a front wall 24, two side walls 26, 28 and a rear wall 30 extending between the corners 32, 34, 36, 38.

The griddle cover 20 includes a handle 50 mounted at one end thereof. The handle 50 includes two upstanding cylindrical support members 54, 56 and a generally cylindrical handle body 52 extending therebetween. While the handle 50 is configured as three cylinders, it should be noted that the handle 50 can be formed in any particular configuration to compliment the overall configuration and appearance of the range.

Figure 3:
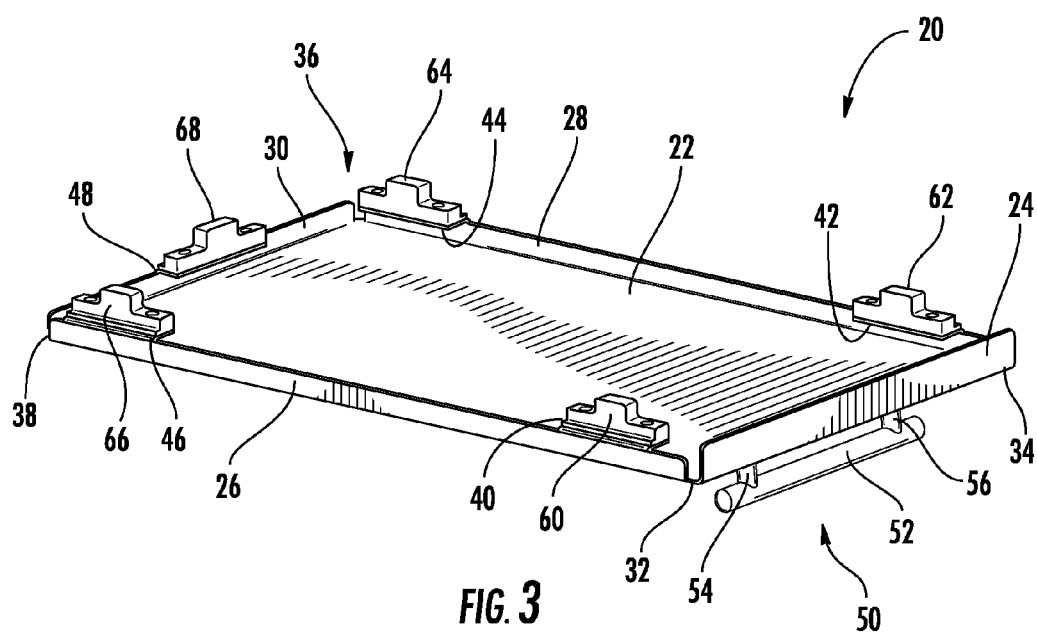
FIG. 3 is a front perspective view of the griddle cover illustrated in FIG. 1 in an inverted position.
Figure 4:
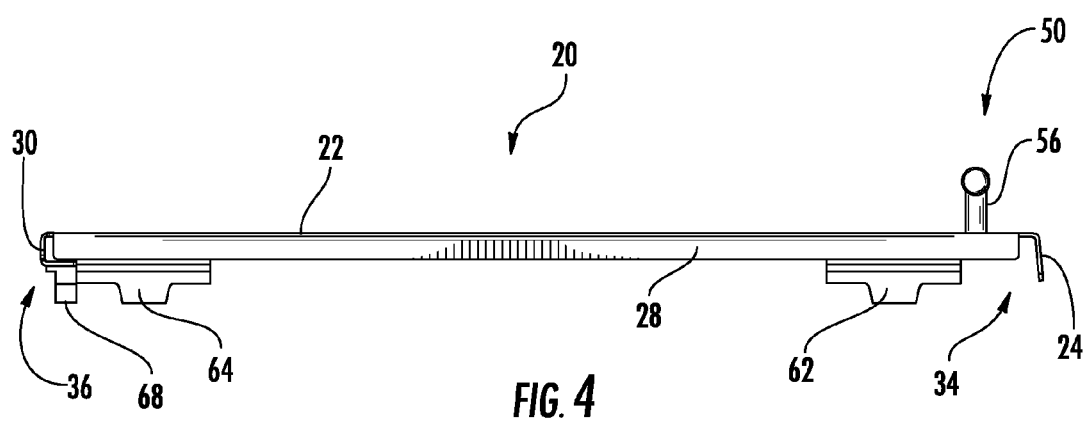
FIG. 4 is a side view of the griddle cover illustrated in FIG. 1.
Figure 5:
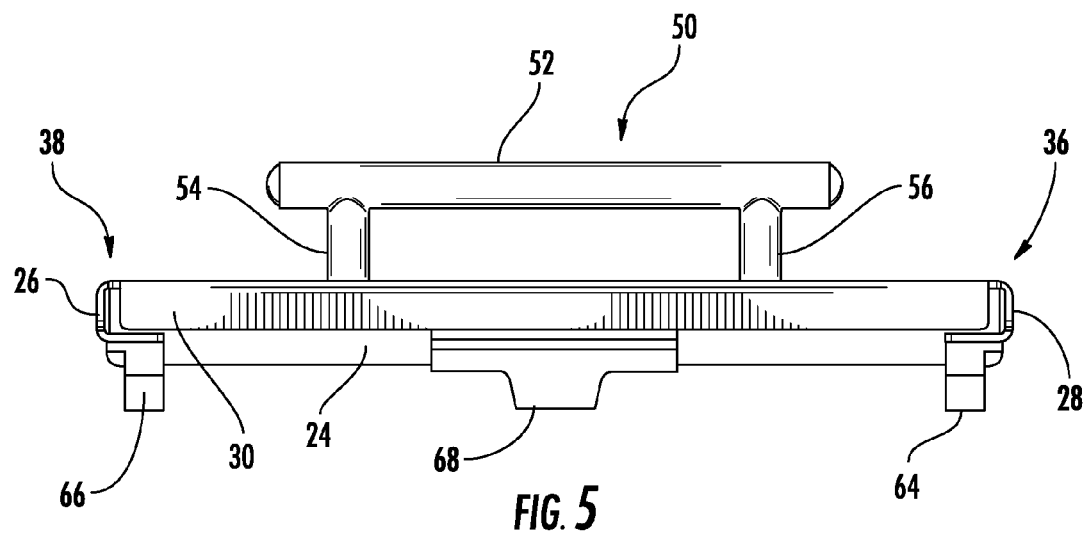
FIG. 5 is a rear view of the griddle cover illustrated in FIG. 1.

With reference to FIGS. 2 and 3, a plurality of support feet 58 are mounted to support elements 40, 42, 44, 46 formed integrally with the side walls 26, 28 adjacent respective corners 32, 34, 36, 38. A fifth foot 68 is mounted to a fifth support element 48 which is formed integrally with the rear wall 30. The fifth foot 68 is positioned at approximately the center of the rear wall 30 intermediate two other side wall mounted feet 64, 66. As will be seen in greater detail hereinafter, the fifth foot 68 helps to position and stabilize the griddle cover 20 when the griddle cover 20 is mounted on a griddle 102. As seen in FIGS. 4, and 5, the griddle cover 20 has feet positioned adjacent the corners and along the rear center portion of the back wall 30.

Figure 6:
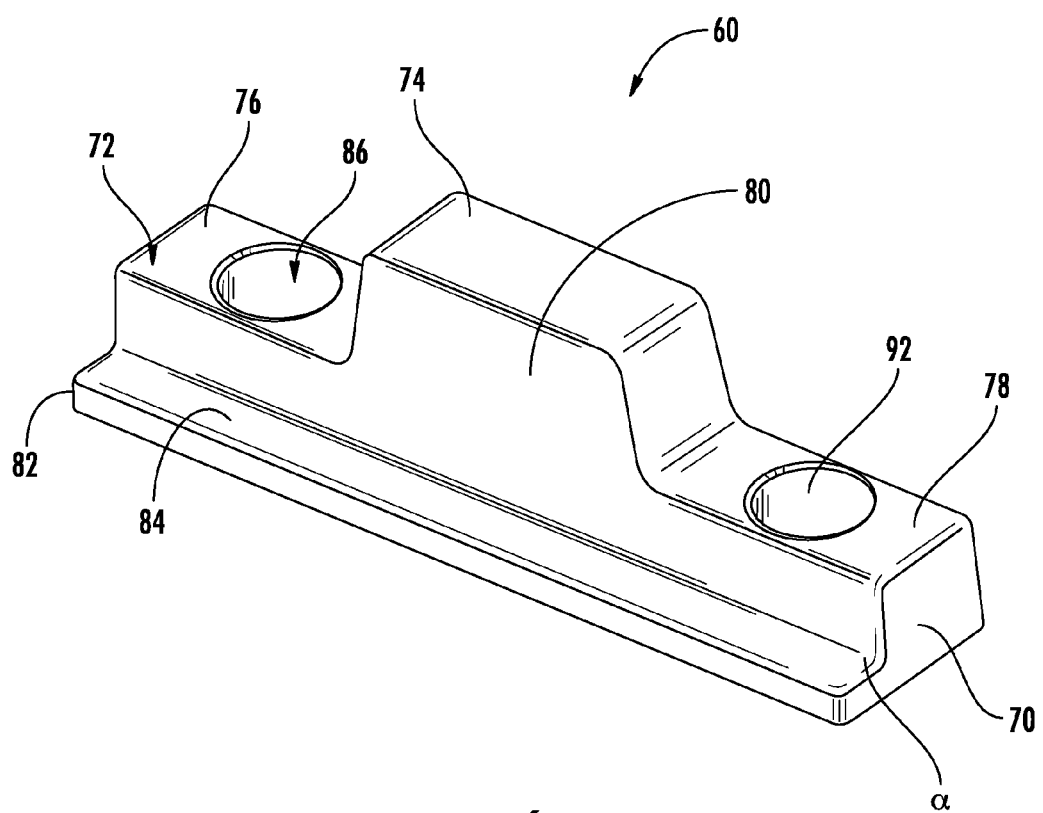
FIG. 6 is a perspective view of one of the feet supporting the griddle cover illustrated in FIG. 1.

Turning now to FIG. 6, one of the plurality of feet 58 is illustrated. Although the foot illustrated in FIG. 6 is identified by the numeral 60, it should be understood that each of the plurality of feet 58 is either identical or substantially similar, and the description of a first foot 60 applies to all remaining feet 62, 64, 66, 68. The use of identical feet helps further lower the cost of the present griddle cover.

For durability and high temperature resistance as well as ease of manufacture, each of the plurality of feet 58 is made from polyphenylene sulfide resin, known to those skilled in the plastic arts as PPS. PPS provides a durable, heat resistant material that is effectively moldable to the present foot configuration and is effective in providing a durable, non-damaging interface with the griddle.

As seen in FIG. 6, a foot 60 includes a foot body 70 having a generally planar top surface 72 extending thereacross. The foot 60 is formed as a generally elongate rectangular volume having a central projection 74 rising from the foot body 70 and defining a first plateau 76 and a second plateau 78 on either side of the projection 74. Each plateau 76, 78 includes a fastener throughbore 86, 92 respectively extending therethrough. It should be understood that the foot 60 illustrated in FIG. 6 is inverted from its use position with the projection 74 extending upwardly and, in use, the projection 74 extends downwardly. The projection 74 enhances the contact surface of the vertical wall 80 for better and more stable engagement of the griddle cover 20 with the griddle 102.

The foot body 70 includes a generally vertical wall 80 for contact with a griddle wall as will be seen in greater detail hereinafter. A flange 82 extends from one side of the foot body 70 and extends the full length thereof. The flange 82 defines a horizontal surface 84 which is also configured for griddle contact as will also be described in greater detail hereinafter. The vertical wall 80 and the horizontal wall 84 define a substantially right angle α therebetween.

Figure 7:
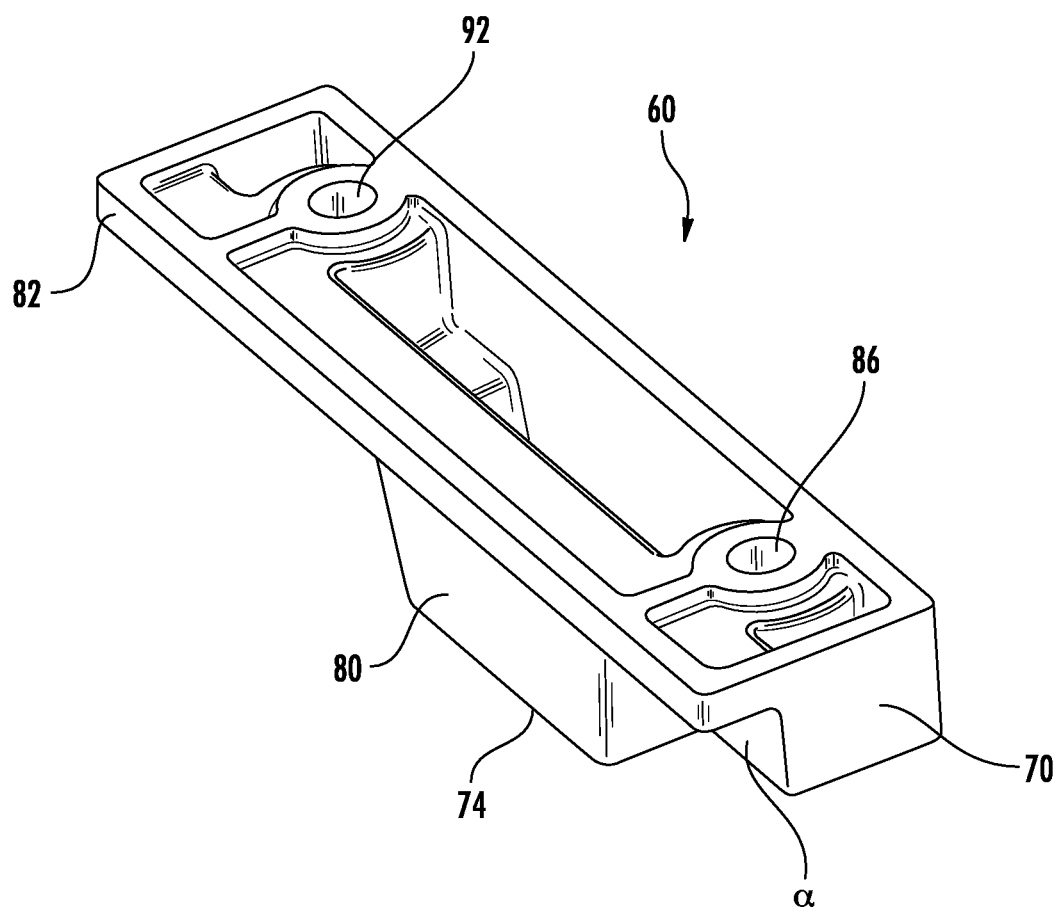
FIG. 7 is a front perspective view of the foot illustrated in FIG. 6 in an inverted position.

Turning now to FIG. 7, the foot 60 is shown inverted from the view in FIG. 6 and illustrates the fastener throughbores 86, 92 passing through the foot body 70. The projection 74 is revealed in FIG. 7 to be hollow and is indicative of the conservation of material available when molding the foot 60 from a polymer such as PPE.

Figure 9:
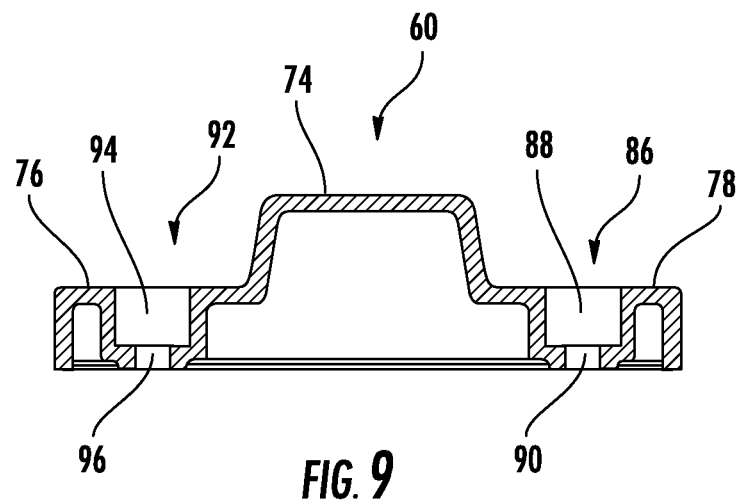
FIG. 9 is a cutaway view of the foot illustrated in FIG. 6 taken though line 9-9 of FIG. 8.
Figure 8:
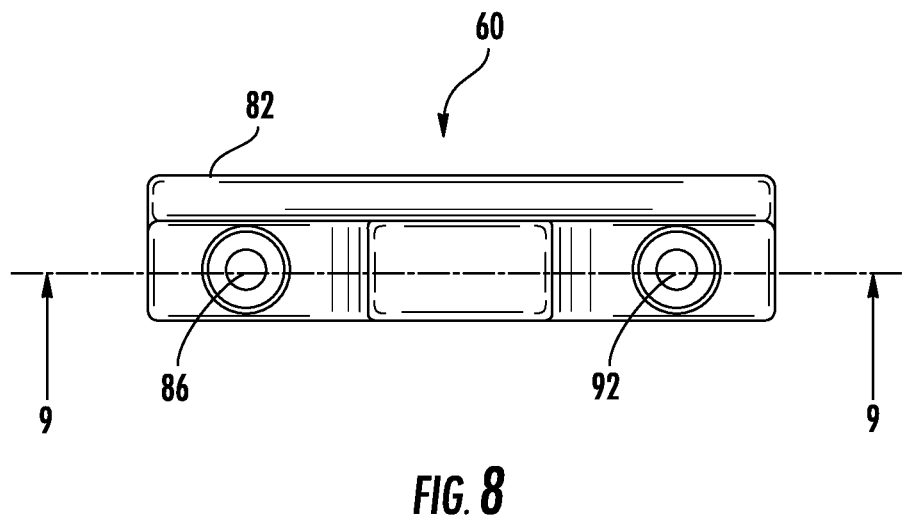
FIG. 8 is a bottom plan view of the foot illustrated in FIG. 6.

FIG. 8 shows a bottom view of the foot 60 wherein line 9-9 defines cutaway view illustrated in FIG. 9. The cutaway view of FIG. 9 illustrates the hollow nature of the projection 74 and the fastener throughbores 86, 92 extending through each plateau 76, 78 respectively. Since the intended fasteners of the present invention are screws, the throughbores 86, 92 each include a head well 88, 94 and a shaft passage 90, 96 open to the respective head wells 88, 94. Accordingly, any screw used to mount the foot 60 will be contained fully within the through bores 86, 92 insofar as the foot 60 is concerned. As may be surmised, the shaft of each screw will extend beyond the through bores 86, 92 for engagement with the respective support flange associated with each foot 60.

Figure 10:
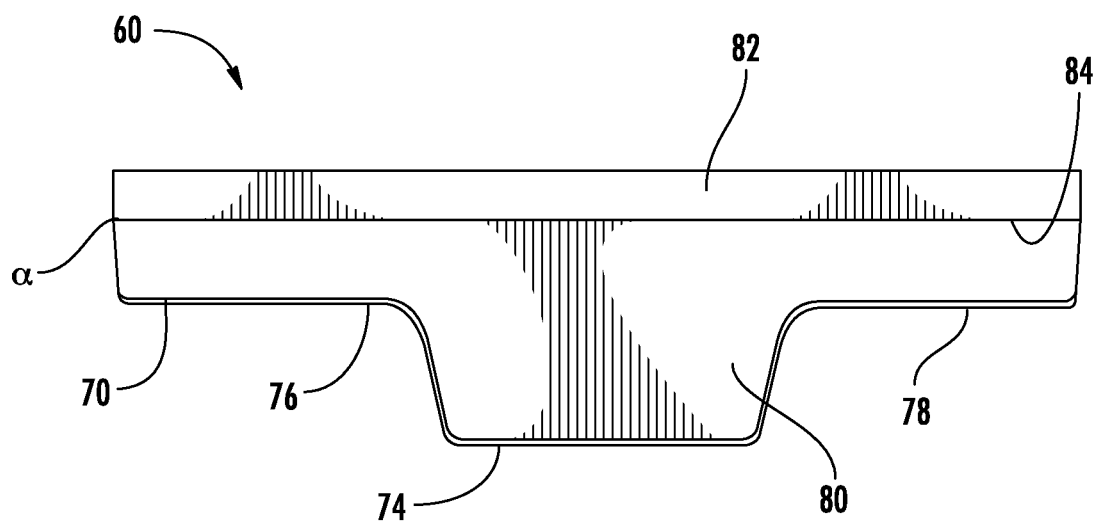
FIG. 10 is a front view of the foot illustrated in FIG. 6.
Figure 11:
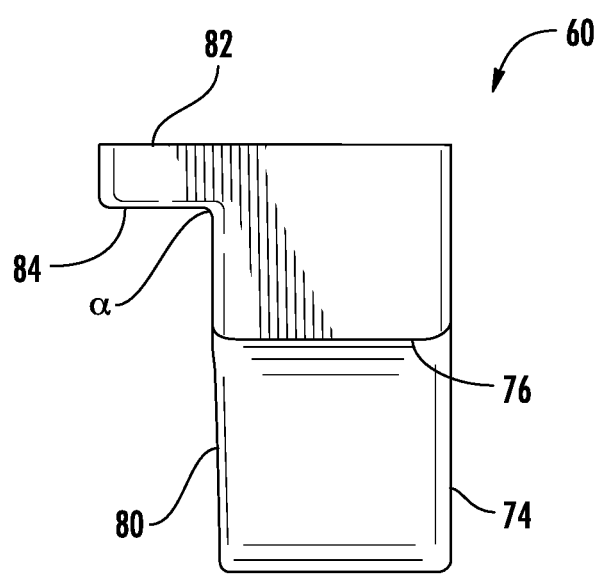
FIG. 11 is a side view of the foot illustrated in FIG. 6.

FIGS. 10 and 11 further illustrate the configuration of the outer portion of the foot 60. The relationship between the horizontal wall 84 and the vertical wall 80 is more fully illustrated and, with particular reference to FIG. 11, the substantially right angle α includes a slightly curved vertex for ease of both manufacture and cleaning.

Figure 12:
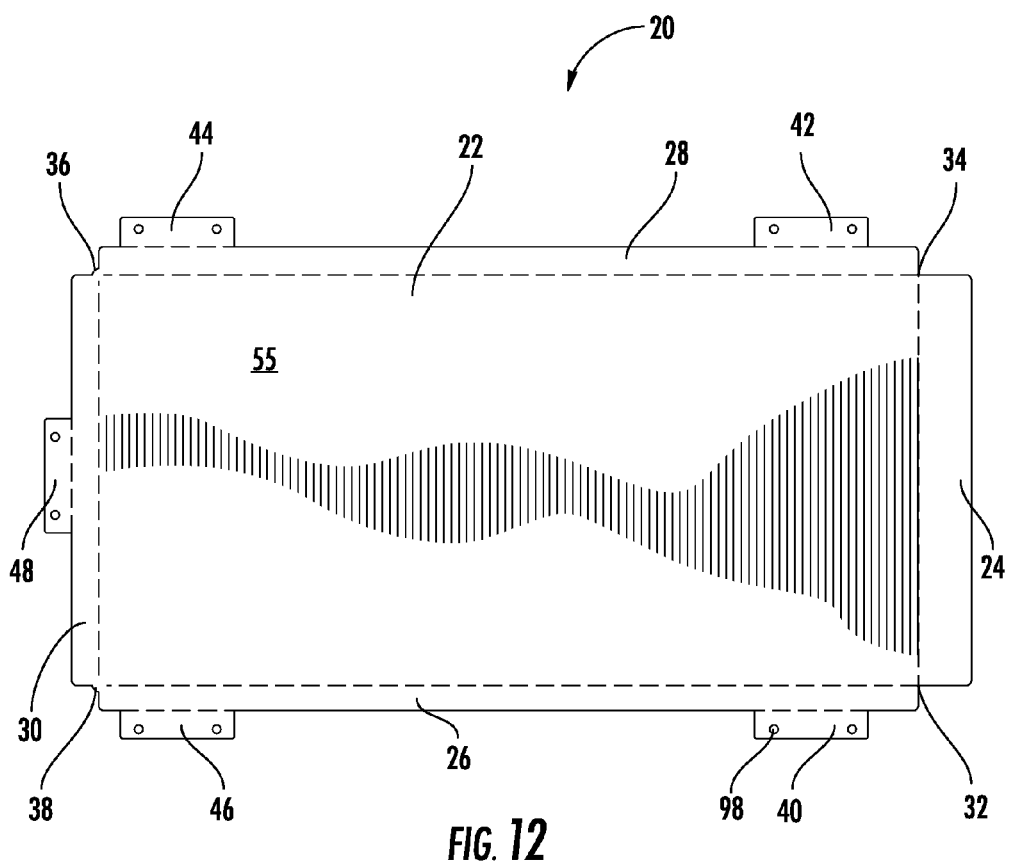
FIG. 12 is a plan view of a metal sheet ready to form into the griddle cover of FIG. 1.

In order to make the griddle cover 20 of the present invention, a generally planar sheet SS of material, preferably metal and, more specifically, stainless steel is provided as seen in FIG. 12. The metal is stamped, cut or otherwise manipulated to form a generally rectangular cover body 22 having a front wall 24, two side walls 26, 28 and rear wall 30 defined therein. Respective corners 32, 34, 36 and 38 are open such that the two end walls 24, 30 are independent of the two side walls 26, 28 thereby defining four individual walls.

Support flanges 40, 42, 44, 46 for supporting feet are formed adjacent each corner 32, 34, 36, 38 of the cover body 22. For example, adjacent the first corner 32, a support flange 40 projects outwardly from the side wall 26 and is formed as a generally rectangular member coplanar with the griddle cover body 22 and including two screw openings 98 that are punched, drilled or otherwise formed adjacent each end of the support flange 40. The support flange 40 is sized in accordance with the overall perimeter of the foot 60. Support flanges 40, 42, 44, 46 are formed at or adjacent all four corners 32, 34, 36, 38 of the cover body 22. A fifth support flange 48 is formed integrally with the rear wall 30 at approximately the center thereof intermediate two other feet 44, 46 which acts to enhance the stability of the present griddle cover and enhances the ease of installation.

As seen in FIG. 12, dotted lines are provided to show the boundaries between the cover body 22, the front wall 24, the side walls 26, 28, the end wall 30, and the support flanges 40, 42, 44, 46, 48. It will be understood that such dotted lines are typically not applied to any actual griddle cover but are presented herein for clarity.

Figure 13:
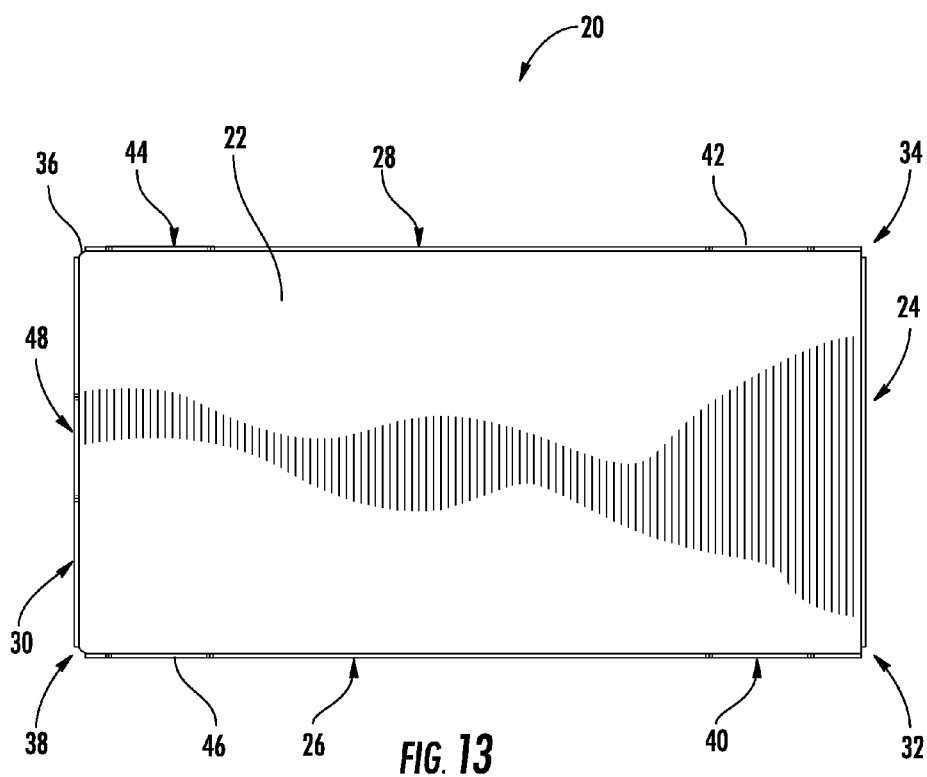
FIG. 13 is a plan view of the sheet illustrated in FIG. 12 at an intermediate stage of manufacture.

Turning now to FIG. 13, an intermediate manufacturing step is illustrated wherein the walls 24, 26, 28, 30 are folded away from the cover body 22 to project away therefrom at approximately a 90° angle. During this intermediate step, the support flanges 40, 42, 44, 46 remain coplanar with the side walls 26, 28 and the end support flange 48 remains coplanar with the end wall 30.

Figure 14:
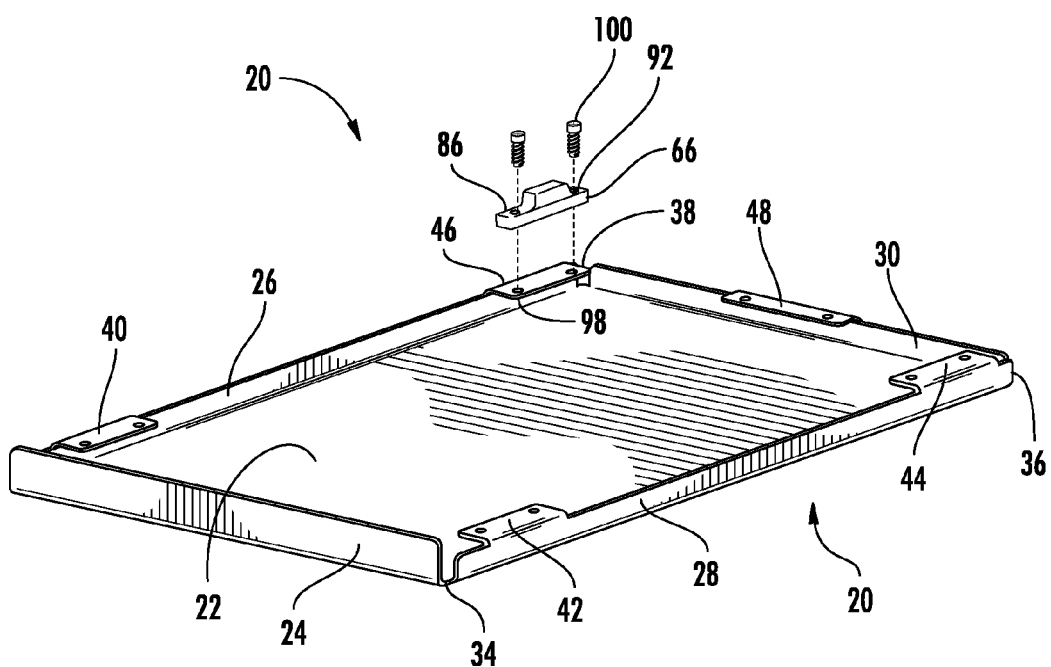
FIG. 14 is a perspective view of the sheet illustrated in FIG. 13 at a later stage of manufacture.

With reference to FIG. 14, the support flanges 40, 42, 44, 46, 48 are then folded, bent or otherwise directed inwardly toward a common center of the cover body 22 such that the planar support flanges 40, 42, 44, 46, 48 extend parallel to and are spaced a predetermined distance from the cover body 22. The plurality of support feet 58 are then attached to their respective support flanges 40, 42, 44, 46, 48 using screws 100 extending through the throughbores 86, 92. In FIG. 14, a single foot 66 is shown for clarity, the single foot 66 being shown exploded from its respective support flange 46.

Figure 15:
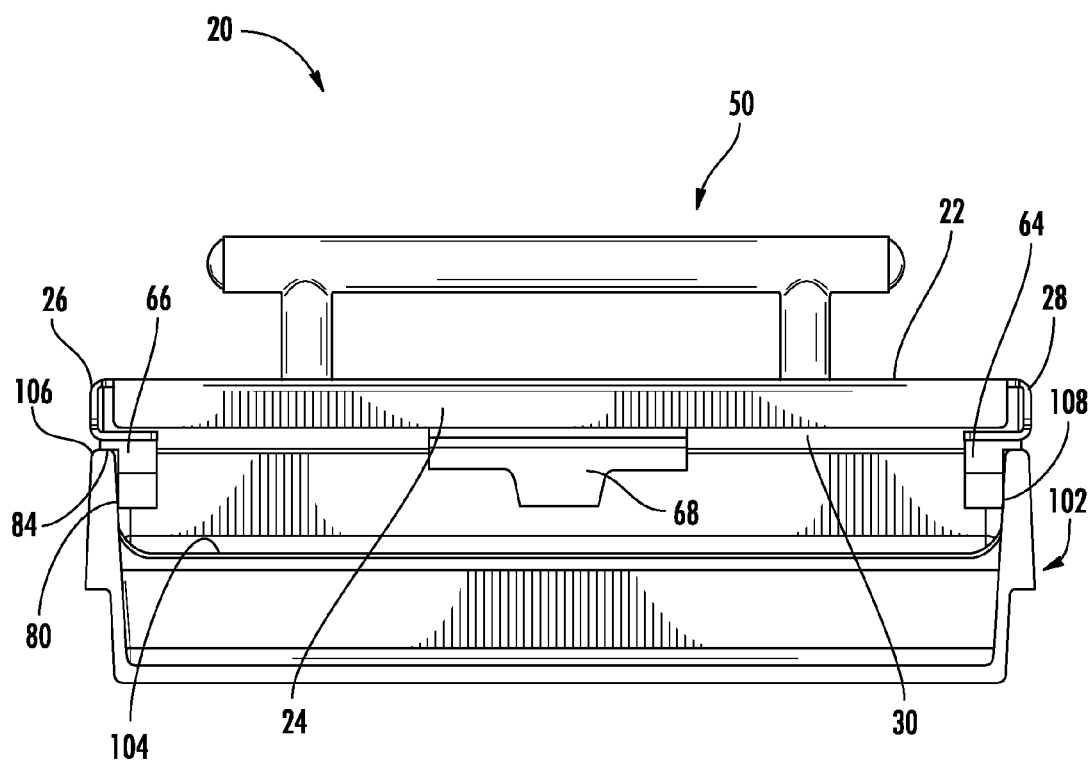
FIG. 15 is a rear view of the griddle cover illustrated in FIG. 1 shown mounted to a griddle.
Figure 16:
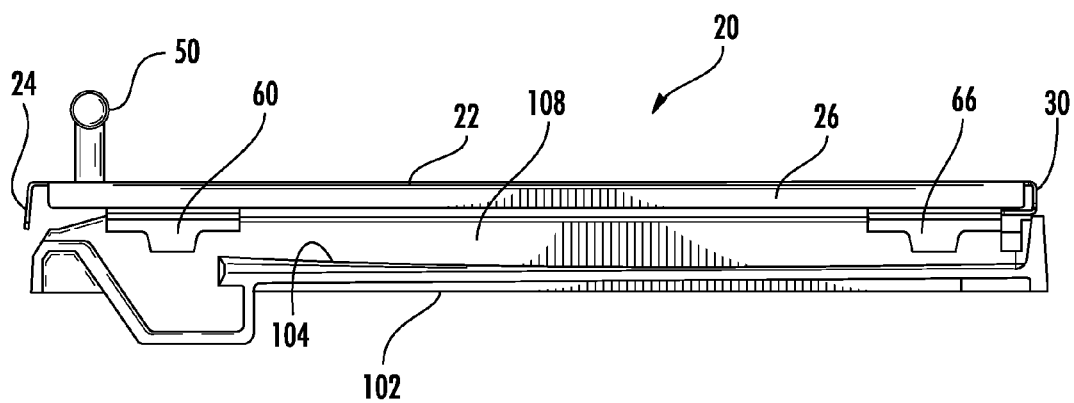
FIG. 16 is a side view of the griddle cover illustrated in FIG. 1 shown mounted to a griddle.

Turning now to FIGS. 15 and 16 interaction of the griddle cover 22 and the griddle 102 may be seen. The griddle 102 is illustrated open from the rear for clarity. There, the griddle cover 22 is fitted to the griddle 102 with the cover body 22 in an overlying relationship with the griddle surface 104 so as to prevent contaminants from reaching the griddle surface 104.

The plurality of feet 58 engage the walls of the griddle wherein a vertical wall 80 of each respective foot 60, 62, 64, 66, 68 engages a vertical wall 108 of the griddle 102. Further, a horizontal wall 84 of each respective foot 60, 62, 64, 66, 68 engages a horizontal wall 106 of the griddle 102. By including one foot at each of five positions on the griddle cover 20 including the four corners 32, 34, 36, 38 and center of the rear wall 30, the present griddle cover 20 provides a stable and easy-to-install griddle cover that can be removed from the front using the handle 50.

By the above, the present griddle cover provides an attractive, easy-to-use cover that protects the griddle of a home appliance such as a range from contaminants as well as from abrasions and other damage from utensils, while maintaining an attractive stainless steel appearance and mounting to the griddle in a user-friendly, non-destructive manner.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

What is claimed is:

1. A home appliance having a griddle cover comprising:
an appliance body;
a cooktop disposed on the appliance body and having a griddle;
a griddle cover for removable disposition on the griddle for protecting the griddle from contaminants, the griddle cover including a cover body having a plurality of support elements on the cover body; and
a mounting arrangement for removably mounting the griddle cover to the griddle including a plurality of feet mounted to and projecting downwardly from the support elements for supporting the griddle cover on the griddle, wherein each foot in the plurality of feet includes a foot body, a central projection extending outwardly from the foot body, a first plateau adjacent a first side of the central projection and a second plateau adjacent a second side of the central projection.

2. A home appliance having a griddle cover according to claim 1 wherein the cover body and the plurality of feet are made from different materials.

3. A home appliance having a griddle cover according to claim 2 wherein the cover body is made from metal and the plurality of feet are made from a non-metallic material.

4. A home appliance having a griddle cover according to claim 3 wherein the plurality of feet are made from a polymer.

5. A home appliance having a griddle cover according to claim 2 wherein the cover body is made from stainless steel and the plurality of feet are made from a polymer.

6. A home appliance having a griddle cover according to claim 1 where the plurality of feet are removably attached to the support elements.

7. A home appliance having a griddle cover according to claim 1 wherein the plurality of feet includes five similar feet.

8. A home appliance having a griddle cover according to claim 7 wherein the cover body is substantially rectangular and the plurality of feet includes one foot adjacent each corner of the cover body and one foot intermediate two other feet.

9. A home appliance having a griddle cover according to claim 1 wherein the cover body is formed from a substantially planar rectangular sheet having a top portion and side walls extending at substantially right angles with the top portion and the support elements extending at substantially right angles with the walls in direct opposition to the top portion, wherein the support elements extend substantially parallel with and spaced from the top portion.

10. A home appliance having a griddle cover according to claim 1 wherein the plurality of feet have a griddle engagement portion including a generally horizontal first wall and a generally vertical second wall projecting downwardly from the first wall.

11. A home appliance having a griddle cover according to claim 10 wherein the first wall and second wall form a substantially 90° angle.

12. A home appliance having a griddle cover according to claim 1 and further comprising a handle mounted to the cover body.

13. A home appliance having a griddle cover according to claim 8 and further comprising a handle mounted to the cover body, with the handle being mounted to the cover body at an end opposite the foot intermediate two other feet.

14. A range having a griddle cover comprising:
a range body;
a cooktop disposed on the range body and having a griddle;
a griddle cover for removable disposition on the griddle for protecting the griddle from contaminants, the griddle cover including a cover body having a plurality of support elements on the cover body; and
a mounting arrangement for removably mounting the griddle cover to the griddle including a plurality of feet mounted to and projecting downwardly from the support elements for supporting the griddle cover on the griddle, wherein each foot in the plurality of feet includes a foot body, a central projection extending outwardly from the foot body, a first plateau adjacent a first side of the central projection and a second plateau adjacent a second side of the central projection.

15. A range having a griddle cover according to claim 14 wherein the cover body and the plurality of feet are made from different materials.

16. A range having a griddle cover according to claim 15 wherein the cover body is made from metal and the plurality of feet are made from a non-metallic material.

17. A range having a griddle cover according to claim 16 wherein the plurality of feet are made from a polymer.

18. A range having a griddle cover according to claim 15 wherein the cover body is made from stainless steel and the plurality of feet are made from a polymer.

19. A range having a griddle cover according to claim 14 where the plurality of feet are removably attached to the support elements.

20. A range having a griddle cover according to claim 14 wherein the plurality of feet includes five similar feet.

21. A range having a griddle cover according to claim 20 wherein the cover body is substantially rectangular and the plurality of feet includes one foot adjacent each corner of the cover body and one foot intermediate two other feet.

22. A range having a griddle cover according to claim 14 wherein the cover body is formed from a substantially planar rectangular sheet having a top portion and side walls extending at substantially right angles with the top portion and the support elements extending at substantially right angles with the walls in direct opposition to the top portion, wherein the support elements extend substantially parallel with and spaced from the top portion.

23. A range having a griddle cover according to claim 14 wherein the plurality of feet have a griddle engagement portion including a generally horizontal first wall and a generally vertical second wall projecting downwardly from the first wall.

24. A range having a griddle cover according to claim 23 wherein the first wall and second wall form a substantially 90° angle.

25. A range having a griddle cover according to claim 14 and further comprising a handle mounted to the cover body.

26. A range having a griddle cover according to claim 21 and further comprising a handle mounted to the cover body, with the handle being mounted to the cover body at an end opposite the foot intermediate two other feet.

27. A home appliance having a griddle cover comprising:
an appliance body;
a cooktop disposed on the appliance body and having a griddle;
a griddle cover for removable disposition on the griddle for protecting the griddle from contaminants, the griddle cover including a cover body having a plurality of support elements on the cover body; and
a mounting arrangement for removably mounting the griddle cover to the griddle including five similar feet mounted to the support elements for supporting the griddle cover on the griddle wherein the cover body is substantially rectangular and the plurality of feet includes one foot adjacent each corner of the cover body and one foot intermediate two other feet.

28. A home appliance having a griddle cover comprising:
an appliance body;
a cooktop disposed on the appliance body and having a griddle;
a griddle cover for removable disposition on the griddle for protecting the griddle from contaminants, the griddle cover including a cover body having a plurality of support elements on the cover body; and
a mounting arrangement for removably mounting the griddle cover to the griddle including a plurality of feet mounted to the support elements for supporting the griddle cover on the griddle, wherein the feet have a griddle engagement portion including a generally horizontal first wall and a generally vertical second wall projecting downwardly from the first wall.

29. A home appliance having a griddle cover comprising:
an appliance body;
a cooktop disposed on the appliance body and having a griddle;
a griddle cover for removable disposition on the griddle for protecting the griddle from contaminants, the griddle cover including a cover body having a plurality of support elements on the cover body; and
a mounting arrangement for removably mounting the griddle cover to the griddle including a plurality of feet mounted to the support elements for supporting the griddle cover on the griddle, wherein the feet have a griddle engagement portion including a generally horizontal first wall and a generally vertical second wall projecting downwardly from the first wall, wherein the first wall and second wall form a substantially 90° angle.

30. A home appliance having a griddle cover comprising:

an appliance body;

a cooktop disposed on the appliance body and having a griddle;

a griddle cover for removable disposition on the griddle for protecting the griddle from contaminants, the griddle cover including a substantially rectangular cover body having a plurality of support elements on the cover body;

a mounting arrangement for removably mounting the griddle cover to the griddle including five similar feet mounted to the support elements for supporting the griddle cover on the griddle, including one foot adjacent each corner of the cover body and one foot intermediate two other feet; and a handle mounted to the cover body, with the handle being mounted to the cover body at an end opposite the foot intermediate two other feet.

* * * * *